United States Patent [19]

Watts

[11] Patent Number: 4,995,409
[45] Date of Patent: Feb. 26, 1991

[54] AUTOMOTIVE PARTS WASHER UTILIZING A VOLATILE CLEANING SOLUTION

[76] Inventor: Craig L. Watts, 30 W. Clarkston Rd., Lake Orion, Mich. 48035

[21] Appl. No.: 471,472

[22] Filed: Jan. 29, 1990

[51] Int. Cl.⁵ ............................................. B08B 3/02
[52] U.S. Cl. ................................. 134/58 R; 134/111; 134/113; 134/180
[58] Field of Search ............... 134/111, 113, 174, 176, 134/179, 180, 181, 200, 58 R; 220/377

[56] References Cited

U.S. PATENT DOCUMENTS

| | | | |
|---|---|---|---|
| 1,675,192 | 6/1928 | Murdoch | 134/176 |
| 2,244,301 | 6/1941 | LeGore | 134/179 X |
| 2,551,379 | 5/1951 | Raus et al. | 134/111 X |
| 2,664,902 | 1/1954 | Campion | 134/176 X |
| 2,706,486 | 4/1955 | Loeb | 134/113 X |
| 2,825,348 | 3/1958 | Low | 134/111 X |
| 3,016,841 | 1/1962 | Albertson et al. | 134/111 X |
| 3,034,518 | 5/1962 | Butsch et al. | 134/176 X |
| 3,092,134 | 6/1963 | Allen et al. | 134/176 X |
| 3,158,160 | 11/1964 | Estandian | 134/176 X |
| 4,051,858 | 10/1977 | Mele | . |
| 4,261,378 | 4/1981 | Otzen | . |
| 4,433,698 | 2/1984 | Blaul | . |
| 4,785,836 | 11/1988 | Yamamoto | . |

FOREIGN PATENT DOCUMENTS

| | | | |
|---|---|---|---|
| 5067 | 12/1932 | Australia | 134/111 |
| 78334 | 5/1962 | France | 134/111 |

*Primary Examiner*—Philip R. Coe
*Attorney, Agent, or Firm*—Irving M. Weiner; Robert M. Petrik; Joseph P. Carrier

[57] ABSTRACT

An apparatus for cleaning small automotive parts. The apparatus includes a spray device for distributing a cleaning solution throughout the cabinet of the apparatus. The cleaning solution may be reused and recycled through the apparatus saving money and preventing the dumping of volatile solutions into the environment.

11 Claims, 3 Drawing Sheets

AUTOMOTIVE PARTS WASHER UTILIZING A VOLATILE CLEANING SOLUTION

BACKGROUND OF THE INVENTION

1. Field of the Invention

The present invention relates to a device for cleaning automotive engine parts. More particularly, the invention relates to a device for washing small transmission pieces or parts and includes an agitator and cycle timer.

Often, it is necessary to clean engine or transmission parts before reassembly of the device. This sometimes required the use of a cleaning solution which is volatile and potentially hazardous to the user.

The present invention is designed to make cleaning of these parts easier, safer and more cost efficient.

2. Description of the Relevant Art

Heretofore, there have been various means for cleaning a desired object.

The most common previous known method for cleaning automotive engine parts comprised of pouring gasoline or other volatile compounds over the part or piece while holding the part in a hand. It has also been known to use "spray can"-type cleaning solutions. These methods are hazardous to the user and the environment. They are also not cost efficient since the cleaning solution is often lost and cannot be reused.

U.S. Pat. No. 4,785,836 discloses an apparatus for automatic cleaning of paint spray gun assemblies, particularly those used in the automotive industry. A cleaning fluid is sprayed from a plurality of outlets within the cabinet. This apparatus does include a time control device.

U.S. Pat. No. 4,433,698 discloses an apparatus including a hand directed spray nozzle for cleaning automobile engine parts. The apparatus includes a clear top for viewing the part that is being cleaned.

U.S. Pat No. 4,051,858 discloses an apparatus for cleaning parts removed from an automobile, including transmission parts. The apparatus employs a hand directed nozzle.

U.S. Pat. No. 4,261,378 discloses an apparatus adapted to be placed atop a barrel containing a cleaning solvent. The apparatus is designed to be used to soak or spray automotive parts.

The present invention provides an efficient and environmentally safe method for cleaning small parts with volatile solvents or other cleaning solutions.

SUMMARY OF THE INVENTION

The present invention provides a compact apparatus for cleaning small parts or pieces of automobile engines and transmissions. In a preferred embodiment, the apparatus includes a rotating sprayer to distribute a cleaning solution. A clear lid permits the user to observe the parts or piece being cleaned. A timer is provided to control the length of the cleaning cycle.

It is an object of the present invention to provide a compact, portable device for cleaning automotive parts.

It is a further object of the present invention to provide a device as set forth above including a spray device to distribute a cleaning solution.

It is a further object of the present invention to provide an environmentally safe method for cleaning these parts.

The above and further objects, details and advantages of the invention will become apparent from the following detailed description, when read in conjunction with the accompanying drawings.

DETAILED DESCRIPTION OF THE PREFERRED EMBODIMENTS

Figure 1:
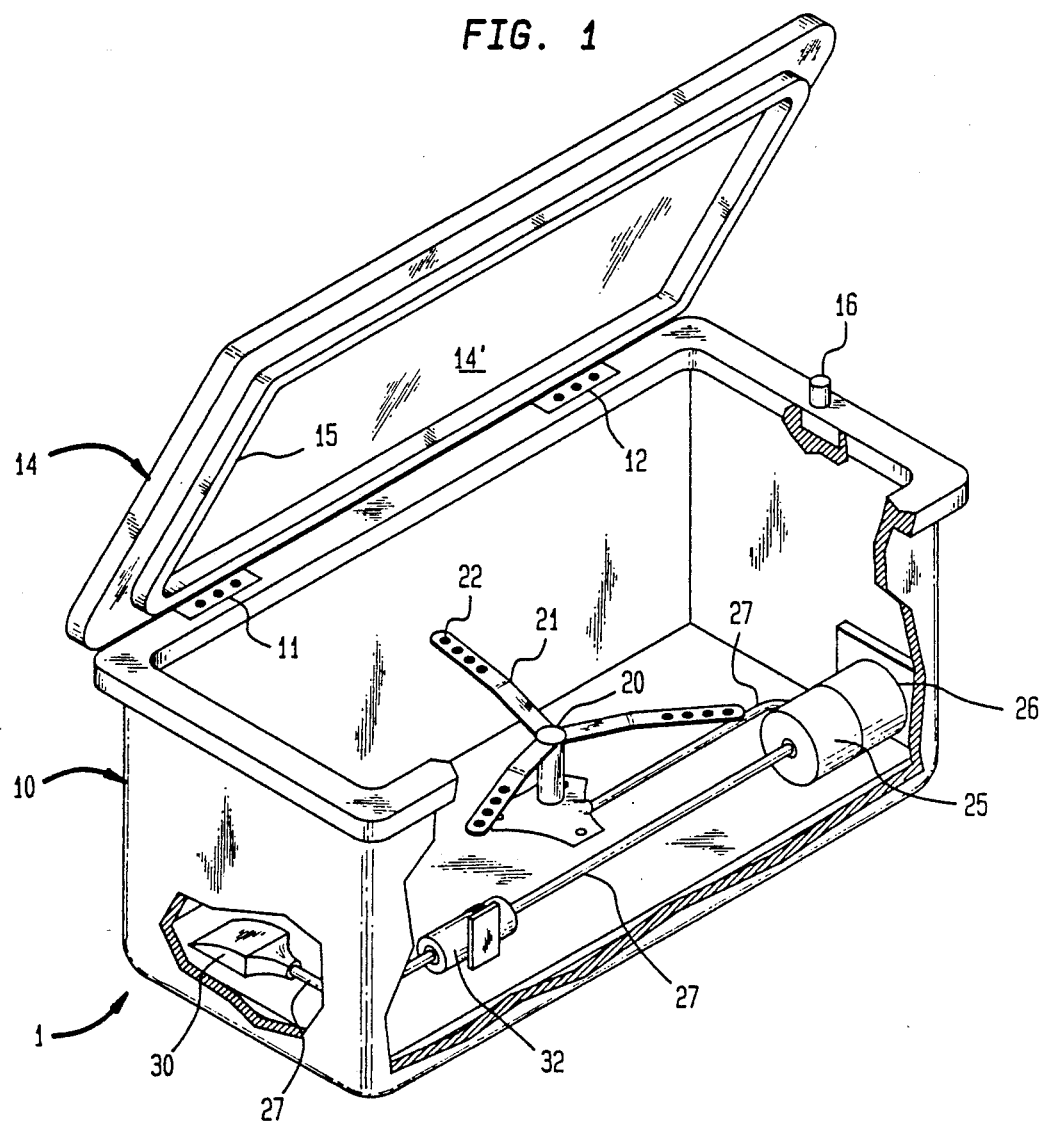
FIG. 1 illustrates a perspective view of the apparatus including cutaway portions to show the internal operating portions in accordance with the present invention.
Figure 2:
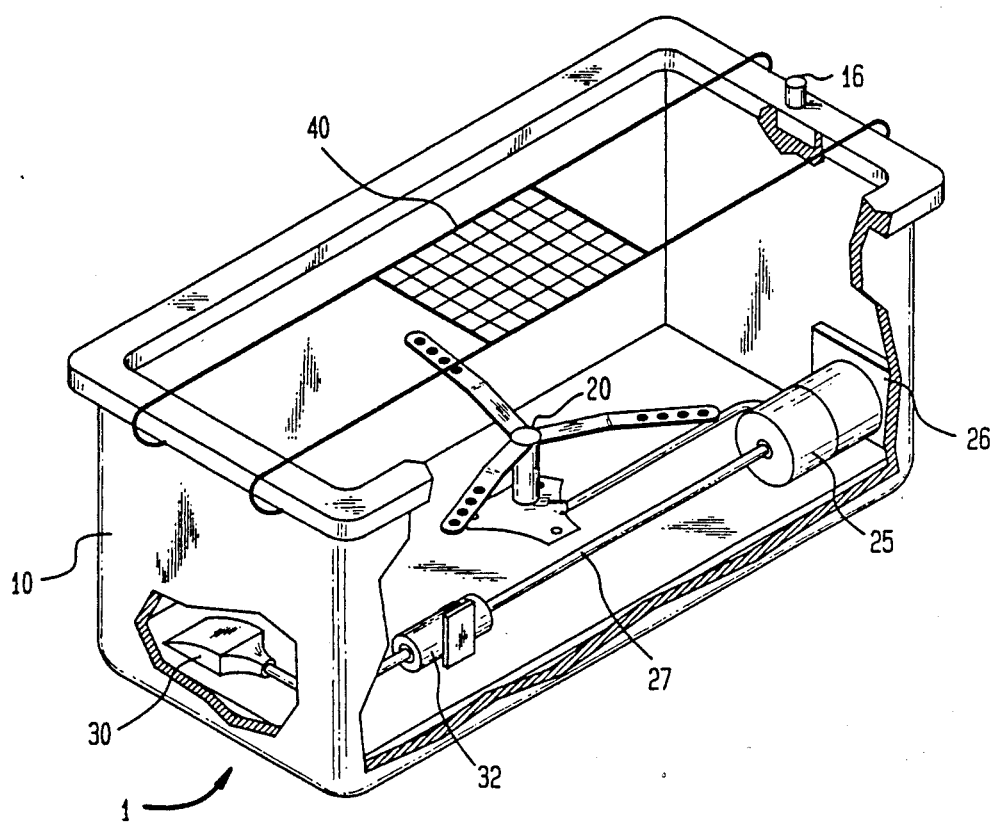
FIG. 2 illustrates a perspective view similar to FIG. 1 without the lid in accordance with the present invention.

As shown in FIG. 1, the apparatus 1 for cleaning automotive parts comprises a small, compact cabinet 10, including four side walls and a bottom, containing all the necessary elements for the performance of a cleaning cycle. The cabinet is preferably, but not necessary, approximately 22.5 inches long, 17.5 inches wide and 10 inches high. Secured by hinges 11, 12 to the cabinet 10 is a lid 14. Lid 14 preferably includes a clear or "see-through" portion 14' to permit a user to observe the operation of the device and determine the degree to which a part may be clean. When the lid 14 is lowered such that the cabinet 10 is closed and latched, safety switch 16 permits operation of the sprayer or agitator 20. Thus, if lid 14 is opened during the performance of a cleaning cycle, switch 16 immediately terminates the cleaning operation.

Figure 3:
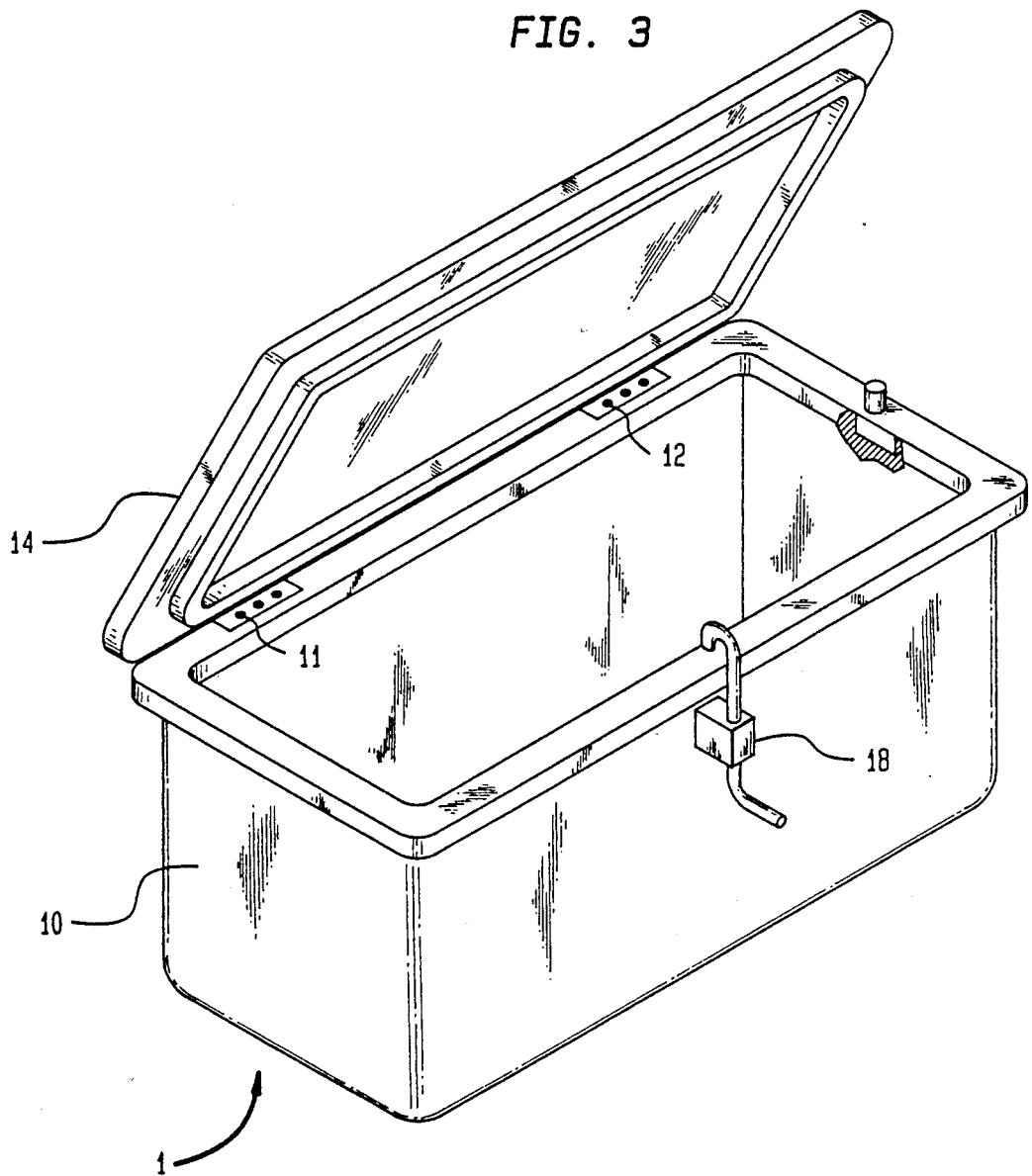
FIG. 3 illustrates a perspective view of the device in accordance with the present invention.

As best seen in FIG. 3, a latch 18 may be provided to secure the lid in a closed position. This also insures that hazardous vapors and cleaning solution do not escape the cabinet 10. In addition, a seal 15 may be provided on lid 14 to further prevent escape of the cleaning solution. Seal 15 should be inert to any chemical reactions that might be caused by the cleaning solution.

The pieces(s) to be cleaned are normally of small size and may be held in the cabinet 10 and subjected to the spray of cleaning solution in a number of ways. Preferably, a tray is supported inside the cabinet 10. This tray would have a significant number of openings to permit the cleaning solution access to the piece(s). It is envisioned that the tray 40 may be supported by legs contacting the bottom of the cabinet or hung from the cabinet side walls. The agitator or sprayer 20 rotates and distributes a cleaning solution throughout the cabinet 10 via apertures 22 at the end of each arm 21. The sprayer is supplied with cleaning solution by pump 25 which is electronically controlled by a timer 26. The pressure of the cleaning solution provides the rotation of the sprayer 20. Timer 26 permits the cleaning cycle to operate up to one hour. This permits the user to continue with work in other areas while the pump is operating and cleaning the necessary part. Pump 25 is connected to sprayer 20 by a conduit 27 as is well known in the art.

Cleaning solution is acquired by the pump by pick-up device or suction end 30. The cleaning solution, after being released from sprayer 20, falls to the bottom of cabinet 10 and can then be suctioned into pick-up deivce 30 by the action of pump 25. Portion 30 may be provided in a sump. Preferably, before the solution is passed through pump 25, the solution is passed through a large particle and minute particle filter 32. This prevents the pump 25 and apertures 22 from becoming clogged and decreasing the efficiency of the apparatus.

The recycling of the cleaning solution is advantageous in that it is cost effective and environmentally safe.

The invention is characterized by extreme simplicity, economy of manufacturing, through durability and convenience of use.

Although there has been described what is at present considered to be preferred embodiments of the invention, it will be understood that various modifications and variations may be made therein, and it is intended to cover in the appended claims all such modifications as fall within the true sprit and scope of the invention.

I Claim:

1. An apparatus for cleaning automotive parts, particularly transmission parts, comprising:
   a small, portable cabinet including four side walls and a bottom adapted to contain a volatile cleaning solution;
   a lid hingedly attached to one of said side walls and including a transparent central portion to permit viewing a part being cleaned inside said cabinet, said transparent portion being delineated by a seal for contacting the upper end of said side walls on the inside of said lid;
   a closed system for recycling said cleaning solution including a three arm rotating spray device supported on the bottom of said cabinet adapted to provide a cleaning action to said part, each said arm including spray holes at the outer end thereof;
   means for supporting the part to be cleaned;
   a filter for said solution to pass through; and
   means for circulating said cleaning solution through said rotating spray device.

2. The apparatus of claim 1, wherein:
   said means for circulating said cleaning solution comprises an electric pump mounted within said cabinet.

3. The apparatus of claim 2, wherein:
   said pump is controlled by an electric timer.

4. The apparatus of claim 3, wherein:
   said pump is operatively connected to said rotating sprayer and a cleaning solution suction means.

5. The apparatus of claim 4, wherein:
   said filter captures minute particles.

6. The apparatus of claim 5, wherein:
   said filter captures large particles.

7. The apparatus of claim 6, wherein:
   said cabinet is approximately 22 inches by 17 inches by 10 inches.

8. The apparatus of claim 7, wherein:
   said pump is additionally controlled by a safety switch activating said pump when said lid is in a closed position.

9. The apparatus of claim 3, wherein:
   said pump is electronically controlled by a timer, said timer permits operation of a cleaning cycle for up to one hour.

10. The apparatus of claim 9, wherein:
    said spray device is mounted to said bottom.

11. The apparatus of claim 1, wherein:
    said lid is secured in a closed position by a latch.

* * * * *